United States Patent [19]

Baer

[11] Patent Number: 4,627,277

[45] Date of Patent: Dec. 9, 1986

[54] MAGNET SELECTOR OR SWITCH

[75] Inventor: John S. Baer, Bar Harbor, Me.

[73] Assignee: RainWise, Inc., Bar Harbor, Me.

[21] Appl. No.: 735,372

[22] Filed: May 17, 1985

[51] Int. Cl.$^4$ .................... G01W 1/04; H01H 36/00
[52] U.S. Cl. .................................. 73/170 R; 335/206
[58] Field of Search ............ 73/170 R; 335/205, 206; 340/601

[56] References Cited

U.S. PATENT DOCUMENTS

| | | | |
|---|---|---|---|
| 3,012,116 | 12/1961 | Boylan et al. | 335/205 |
| 3,720,896 | 3/1973 | Beierlein | 335/206 |
| 3,792,389 | 2/1974 | Murphy | 335/205 |
| 4,287,762 | 9/1981 | Baer . | |
| 4,554,422 | 11/1985 | Embrey et al. | 335/206 X |

OTHER PUBLICATIONS

D. E. Eastwood–IBM Tech. Disc. Bull., vol. 8, No. 8, Jan. 1966, p. 1034.

Primary Examiner—Charles A. Ruehl
Attorney, Agent, or Firm—Daniel H. Kane, Jr.

[57] ABSTRACT

A magnet switch or selector for selecting the functions of a multiple function electronic circuit device in a housing. A plurality of reed switches are incorporated into the electronic circuit device for switching on and off respectively the multiple functions. The reed switches are arranged in a sequence in proximity to a horizontal surface of the housing. An elongate sliding groove or sliding channel is formed in the horizontal surface of the housing in proximity to the reed switches, and the channel is oriented and arranged in a configuration along the sequence of reed switches. A magnet element having a cross-sectional profile substantially conforming to the cross-sectional profile of the channel is seated in the channel for restrained and controlled sliding motion back and forth along the sliding channel. The magnet element is magnetized with magnetic lines of force extending into the housing below the magnet element when the magnet element is seated in the sliding channel for selected magnetic actuation of the reed switches according to the position of the magnet element in the sliding channel. The magnet selector may also have a plurality of sliding channels and a plurality of magnet elements seated in respective sliding channels.

19 Claims, 10 Drawing Figures

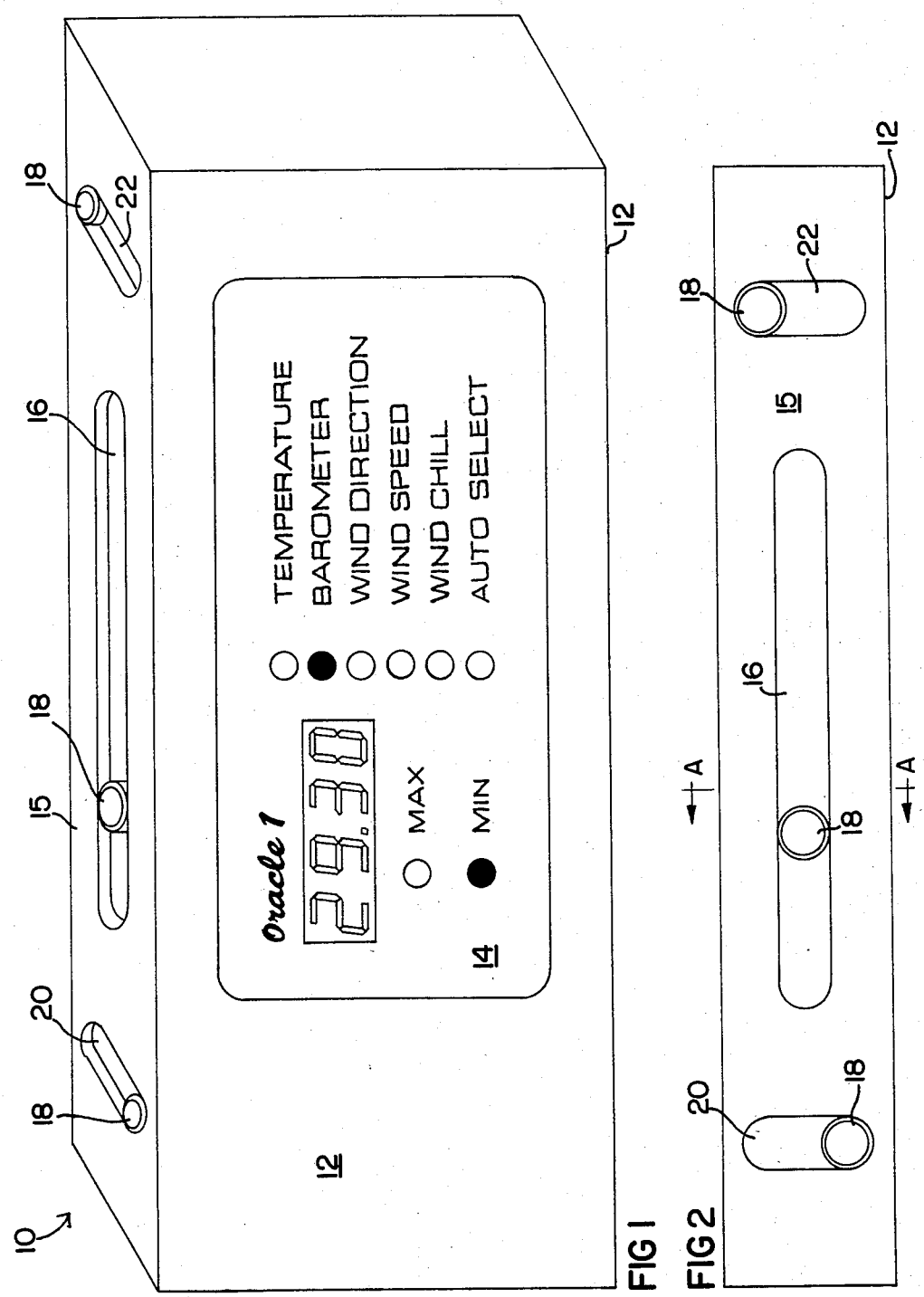

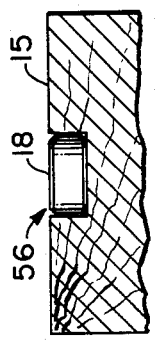
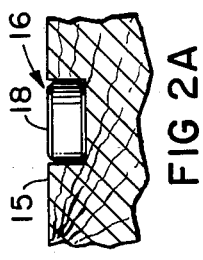
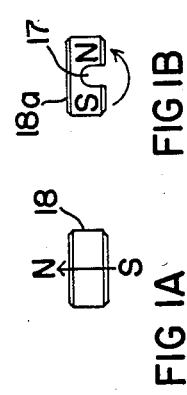
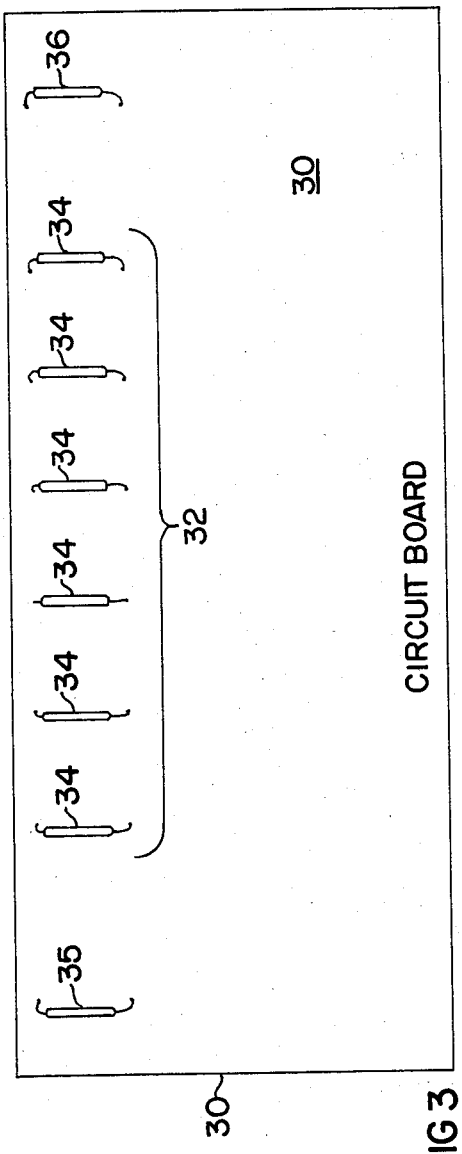
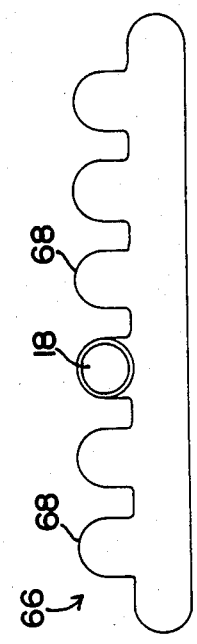
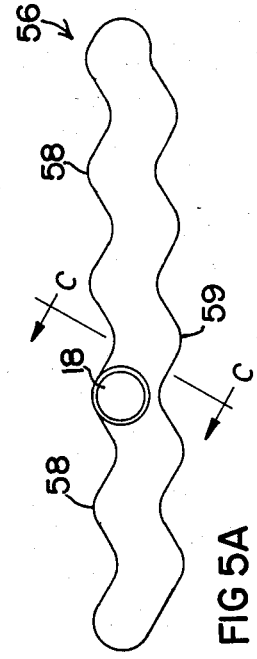

MAGNET SELECTOR OR SWITCH

TECHNICAL FIELD

This invention relates to a new magnet switch or magnet selector particularly applicable for switching and selecting the functions of a multiple function electronic circuit device in a housing. For example, the invention is applied in switching and selecting for display the different weather functions of an electronic weather monitor or weather center.

BACKGROUND ART

U.S. Pat. No. 4,287,762 describes a digital electronic weather center or weather monitor with digital display and circuitry for selecting and displaying any of a number of monitored weather functions such as indoor and outdoor temperatures, pressure, wind speed and direction, rainfall, and humidity. The weather parameters are monitored by various transducers coupled to the weather center circuitry. The memory and microprocessor permit selection and display from memory of maximum and minimum readings of the monitored parameters and selection of additional calculated functions such as wind chill, degree days, and time and date. Selection is made from among the multiple functions by a conventional rotary switch having a rotary dial with detent positions for selecting a particular transducer and associated circuitry and display elements. Conventional pushbutton switches may also be used for selecting maximum and minimum values to display along with time of occurrence or for selecting other functions.

OBJECTS OF THE INVENTION

It is an object of the present invention to provide new and simpler selector elements or switches for selecting among the functions of multiple function electronic circuits. Another object of the invention is to provide new and simpler selector elements or switches which may be incorporated as an integral part of the housing of the multiple function electronic circuit and which reduce the cost of the circuit device.

DISCLOSURE OF THE INVENTION

In order to accomplish these results the present invention provides a magnet switch or selector for switching an electronic circuit device in a housing in which at least one reed switch is incorporated into the circuit device in proximity to a horizontal surface of the housing. According to the invention an elongate sliding groove or sliding channel is formed in the horizontal surface of the housing above the reed switch. A removable and replaceable magnet element is seated in the channel for sliding motion back and forth along the sliding channel.

The magnet element is magnetized to provide magnetic lines of force extending into the housing below the magnet element so that the reed switch is actuated according to the position of the magnet element in the sliding channel. The magnet element is also generally formed having a cross-sectional profile or dimension conforming to the cross-sectional profile or dimension of the channel for constrained and controlled sliding motion back and forth between selector positions. Typically, the magnet element is in the configuration of a cylinder with the north-south pole of magnetization coinciding with the central axis of the cylinder. The cylinder may alternatively be formed with a groove across the bottom of the cylinder along a diameter providing an effective horseshoe magnet with the north-south pole of magnetization oriented across the groove at right angles.

According to the preferred embodiment, a plurality of reed switches are incorporated into the electronic circuit device, arranged in a sequence in proximity to a horizontal surface of the housing for switching on and off and selecting among multiple functions. An elongate sliding groove or channel formed in the horizontal surface of the housing is oriented and arranged in a configuration along the sequence of reed switches for selecting a function according to the selector position of the magnet along the sliding channel.

The invention also contemplates that the housing may be formed with a plurality of separate sliding channels with separate magnet elements seated in respective sliding channels for switching and selecting different functions or from different families or groups of functions. For example, the maximum and minimum values or readings of a particular parameter such as a weather parameter may be selected by separate magnet elements in separate sliding channels. The sliding channels may be oriented with the elongate sliding directions at different angles from each other such as at right angles to facilitate distinguishing and differentiating different selectable functions or groups of functions. The sliding channels are typically linear but may be non-linear such a zig-zag or branched configurations to facilitate identifying selector positions. Other objects, features and advantages of the invention are apparent in the following specification and accompanying drawings.

BRIEF DESCRIPTION OF THE DRAWINGS

FIG. 1 is a perspective view of a multiple function weather monitor incorporating the magnet selector or magnet switch according to the present invention.

FIGS. 1A and 1B are side views respectively of alternate magnet elements for use in the magnet selector or magnet switch.

FIG. 2 is a top plan view of the multiple function weather monitor showing the magnet selector formed in the housing of the device.

FIG. 2A is a fragmentary side cross sectional view through the sliding groove or channel of the magnet selector of FIG. 2 in the direction of the arrows on line A—A of FIG. 2.

FIG. 3 is a diagrammatic view showing the placement of reed switches on the circuit board of the device in proximity to the upper horizontal surface of the housing.

FIG. 5A and 5B are diagrammatic plan views respectively of alternate zig-zag and branched sliding channel configurations to facilitate identifying selector positions.

FIG. 5C is a fragmentary side cross sectional view through the channel of the magnet selector of FIG. 5A in the direction of the arrows on line C—C of FIG. 5A.

DESCRIPTION OF PREFERRED EXAMPLE EMBODIMENTS AND BEST MODE OF THE INVENTION

Figure 4:
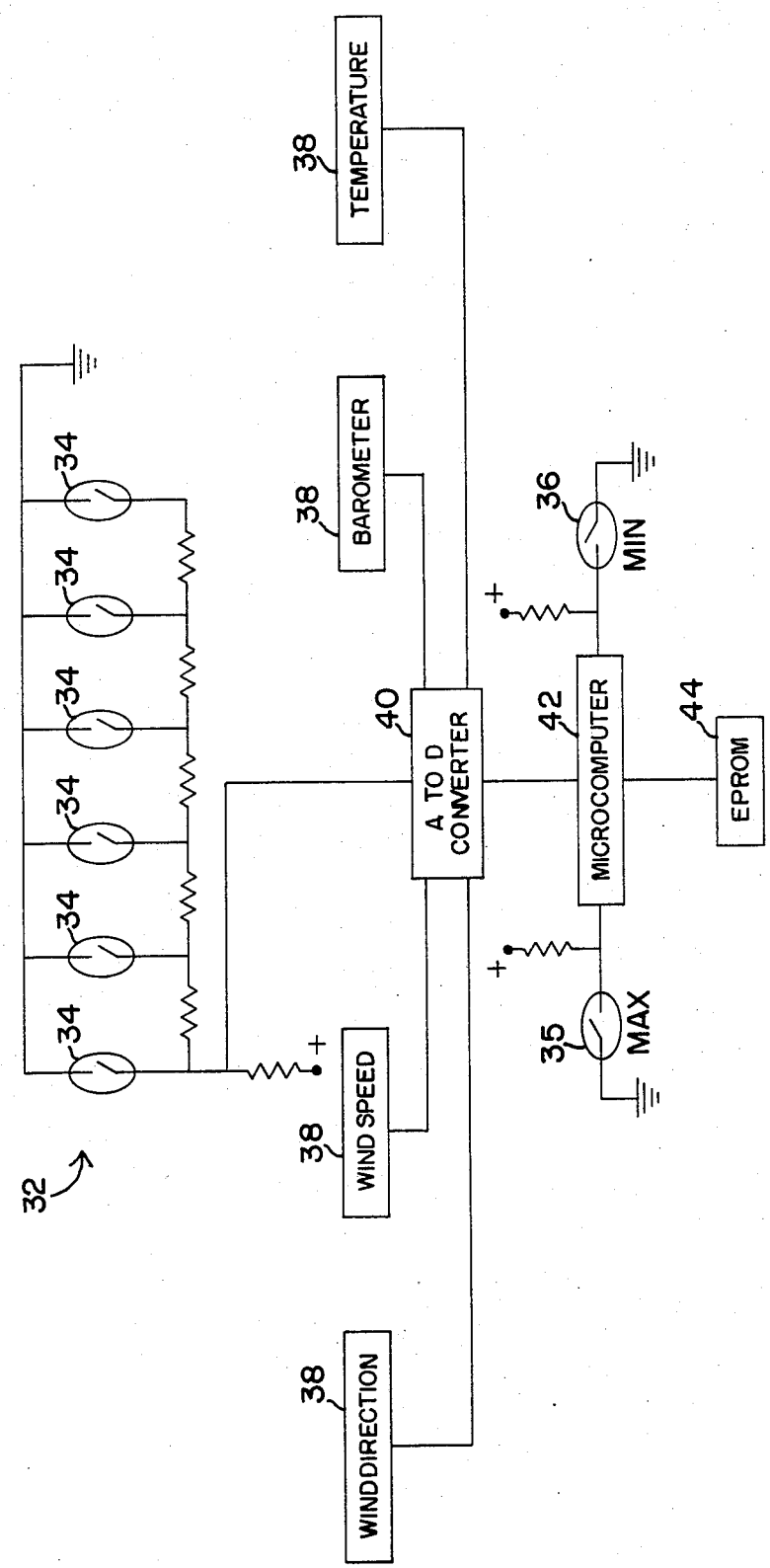
FIG. 4 is an example block diagram of the multiple function weather monitor circuitry.

In the example according to the present invention illustrated in FIGS. 1 and 2 there is shown a weather monitor or home weather center 10 comprising a housing 12 with a multiple weather function display 14. The internal circuitry of the device is contained on a circuit board hereafter described with reference to FIGS. 3 and 4. The circuitry permits monitoring weather readings from a number of weather sensors or transducers, not shown, at appropriate locations coupled to the internal circuitry. The layout of display elements on the display 14 permits differentiating the various monitored weather function readings and for specifying which function value is displayed on the digital readout all as further described in U.S. Pat. No. 4,287,762 referred to above.

According to the invention, the upper horizontal surface 15 of the housing 12 if formed with an elongate sliding groove or sliding channel 16 having a rectangular cross-section profile and rounded ends. A magnet element 18 is seated in the sliding channel 16 for sliding motion back and forth in the elongate direction. As shown in FIG. 1A, the magnet element is formed in cylindrical configuration and the rectangular cross-sectional profile of the cylinder conforms to that of the groove in shape and dimension for constrained and controlled sliding motion of the cylinder magnet element in the sliding channel.

The upper portion 15 of housing 12 is formed of wood, plastic, or other non-magnetic material so that lines of force from the magnet 18 can penetrate into the housing. The magnetization of the cylinder 18, for example as shown in FIG 1A, is oriented with the north-south pole of magnetization coinciding with the central axis of the cylinder to assure that the magnetic lines of force extend into the housing. By way of another example, as shown in FIG. 1B, the cylinder 18a is formed with a groove 17 across the bottom of the cylinder along a diameter forming an effective horseshoe magnet in which the north-south pole is oriented across the groove at right angles between the arms of the horseshoe magnet. In either example, the magnetic lines of force and magnetic field extend into the upper portion of the housing 12.

The top of housing 12 is also formed with two additional sliding channels or grooves 20 and 22 similar to sliding channel 16 but shorter in length, in each of which is seated a further magnet element 18. Sliding channels 20 and 22 permit selection of a different family or group of functions from sliding groove 16, for example the selection of maximum and minimum values for the monitored parameters associated with sliding channel 16. For example, the magnet 18 in channel 20 may be positioned to select maximum values from memory while the magnet 18 in channel 22 may be positioned to select minimum values for display, alternating, for example, with the time of occurrence of the minimum or maximum event. All readings appear on the digital readout portion of display 14. Channels 20 and 22 are oriented at right angles to the elongate channel 16 and at either end to facilitate separation and differentiation of the different types of functions. Thus, the multi-channel magnet selector or switch shown by way of example in FIGS. 1 and 2 permits separating functions by type, and the geometrical or spatial orientation of the multiple channels is arranged to avoid confusion and facilitate the operation of the selector.

A circuit board 30 according to the invention for use in the multi-function weather station 12 is illustrated in FIG. 3. The circuit board 30 is diagrammatic without showing detail of content except for the novel features incorporated for cooperation with the magnet selector according to the invention. A row or sequence 32 of reed switches 34 is incorporated into the electronic circuitry and arranged along the top of the circuit board 30 for proximity to the upper horizontal surface or portion 15 of housing 12. When the circuit board is installed in the back of housing 12, the elongate sliding channel 16 is constructed and arranged to lie over and along the row 32 of reed switches 34 for selective actuation of the reed switches according to the selector position of the magnet cylinder 18 in the sliding channel 16. Thus, the magnetic lines of force from the magnet element 18 extend into the housing to actuate, operate or switch the reed switch when the magnet 18 is positioned substantially over a particular reed switch.

The six reed switches 34 correspond, for example, to the weather functions temperature, barometer, wind direction, wind speed, wind chill and "auto select" as shown on the display 14, and control the display by circuit portions associated with each weather function being monitored. "Auto select" results in automatic cycling through the other weather functions, all as further described in the U.S. Pat. No. 4,287,762. Additionally, reed switches 35 and 36 are also provided, separated and spaced from the row or sequence 32 and spaced from each other. Reed switches 35 and 36 are positioned on the circuit board 30 to underly sliding channels 20 and 22 when the circuit board 30 is installed in the back of the housing 12 of the weather monitor 10. The separate sliding channels are spaced a sufficient distance from each other to prevent interference or "cross-talk" from the respective magnets 18 between "channels". In this way unique functions such as the "minimum" and "maximum" readings, applicable for example to all the others associated with row 32 can be separately addressed and selected.

An example block diagram for a circuit board 30 is shown in FIG. 4. The multiple function weather monitor circuitry incorporates the row 32 of reed switches 34 corresponding to the different monitoring functions, and reed switches 35 and 36 for implementing and displaying maximum and minimum values of the different functions. Direct weather parameter readings are input from the weather transducers 38 through analog-to-digital converter 40 to microprocessor 42 which is controlled in part by EPROM 44 to provide additional calculated functions according to prescribed programs.

While the elongate sliding channel 16 of FIGS. 1 and 2 is linear, non-linear sliding channels are also contemplated by the present invention, for example, to facilitate identification of selector positions in the channel. In FIG. 5A a zig-zag sliding channel 56 for the cylinder magnet 18 is shown with peaks 58, for example, coinciding with reed switch selector positions corresponding to functions to be selected or switched. Alternatively or in addition, the "valleys" 59 can be used to locate selector positions. Thus, the reed switches incorporated into the electronic circuitry of the device need not be in a simple row or linear sequence but may themselves be arranged in some non-linear sequence with the configuration of the sliding channel appropriately formed to provide selector positions over the respective reed switches. The reed switches, for example, may be located on separate circuit boards with the sliding channel configured to run across the circuit boards to specified reed switch locations.

As shown in FIG. 5B the elongate sliding channel 66 may be "branched" providing a selector position in each branch 68 of the channel 66. The branching may take a variety of configurations. In the example of FIG. 5B the branches are shown as short perpendicular side paths 68 from a linear main path. Other examples of elongate sliding groove or channel configurations may include, for example, an arc or other curve.

While the invention has been described with reference to the example embodiment of a multi-function weather monitor, it is intended to apply to all multiple function electronic circuits and cover all modifications and equivalents within the scope of the following claims.

We claim:

1. A magnet switch for switching an electronic circuit device in a housing comprising:

at least one reed switch incorporated in said electronic circuit device in proximity to a horizontal surface of the housing;

an elongate sliding groove or sliding channel formed in said horizontal surface of the housing above the reed switch, said sliding channel having a cross sectional profile open at the top; and a magnet element removable and replaceable in the sliding channel through the open top of the sliding channel, said magnet element being seated in the sliding channel for sliding motion back and forth along the sliding channel, said magnet element being magnetized with magnetic lines of force extending into the housing below the magnet element when the magnet element is seated in the sliding channel for magnetic actuation of the reed switch according to the position of the magnet element in the sliding channel.

2. The magnet switch of claim 1 in which the magnet element is formed in a cylinder configuration with the north-south pole of magnetization coinciding with the central axis of the cylinder.

3. The magnet switch of claim 1 wherein the magnet element is formed in cylinder configuration with a groove across the bottom of the cylinder along a diameter and in which the north-south pole of magnetization is oriented across the groove at right angles forming an effective horseshoe magnet.

4. The magnet switch of claim 1 in which the electronic circuit device incorporates a plurality of reed switches arranged in a sequence in proximity to a horizontal surface of the housing, and wherein the elongate sliding channel formed in said horizontal surface of the housing is oriented and arranged along the sequence of reed switches for selected magnetic actuation of the reed switches according to the position of the magnet element in the sliding channel.

5. A magnet switch for switching and selecting functions of a multiple function electronic circuit device in a housing comprising:

a plurality of reed switches incorporated in said electronic circuit device for switching on and off respectively the multiple functions, said reed switches being arranged in a sequence in proximity to a horizontal surface of the housing;

an elongate sliding groove or sliding channel formed in said horizontal surface of the housing in proximity to the reed switches, said channel being oriented and arranged in a configuration along the sequence of reed switches;

and a magnet element removeable and replaceable in the sliding channel, said magnet element having a cross-sectional profile substantially conforming to the cross-sectional profile of the channel for seating in the channel and for restraining and controlling sliding motion back and forth along the sliding channel, said magnet element being magnetized with magnetic lines of force extending into the housing below the magnet element when the magnet element is seated in the sliding channel for selected magnetic actuation of the reed switches according to the position of the magnet element in the sliding channel.

6. The magnet switch of claim 5 comprising a plurality of sliding channels and a plurality of magnet elements. seated in respective sliding channels.

7. The magnet switch of claim 6 wherein the electronic circuit device comprises at least a first separate reed switch in proximity to said horizontal surface of the housing spaced from said sequence of reed switches for switching a first separate function, a second sliding channel formed in said horizontal surface of the housing in proximity to said first separate reed switch, and a second magnet element constructed and arranged for seating in the second sliding channel and for sliding motion back and forth for selectively switching the first separate reed switch according to the position of the second magnet element in the second sliding channel.

8. The magnet switch of claim 7 wherein the electronic circuit device comprises at least a second separate reed switch for switching a second separate function of the electronic circuit device, said second separate reed switch being positioned in proximity to the horizontal surface of the housing spaced from the sequence of reed switches and from the first separate reed switch, a third sliding channel formed in said horizontal surface of the housing in proximity to said second separate reed switch, and a third magnet element constructed and arranged for seating in the third sliding channel and for sliding motion back and forth for selectively switching the second separate reed switch according to the position of the third magnet element in the third sliding channel.

9. The magnet switch of claim 8 wherein the second and third sliding channels are oriented with the sliding direction of the respective second and third magnet elements at right angles to the sliding direction of the magnet element in the elongate sliding channel.

10. The magnet switch of claim 8 wherein the multiple function electronic circuit device comprises a weather monitor having a plurality of weather-related monitoring functions and a display panel with a plurality of weather indicators operatively coupled respectively to the plurality of reed switches for selectively displaying the value of weather functions according to the position of the magnet element in the sliding channel.

11. The magnet switch of claim 10 wherein the multiple function electronic circuit device comprises memory means for storing values of the multiple weather functions sand logic means for selecting the minimum and maximum values, wherein the display means comprise indicator means operatively coupled to the second and third separate reed switches respectively for displaying said minimum and maximum values according to the positions of the second and third magnet elements in the second and third sliding channels respectively.

12. The magnet switch of claim 11 wherein the second and third sliding channels are oriented with the sliding direction of the respective second and third magnet elements at right angles to the sliding direction of the magnet element in the elongate sliding channel.

13. The magnet switch of claim 5 wherein the multiple function electronic circuit device comprises a weather monitor having a pluraity of weather-related monitoring functions and a display panel with a plurality of weather indicators operatively coupled respectively to the plurality of reed switches for selectively displaying the value of weather functions according to the position of the magnet element in the sliding channel.

14. The magnet switch of claim 5 in which the magnet element is formed in a cylinder configuration with the north-south pole of magnetization substantially coinciding with the central axis of the cylinder.

15. The magnet switch of claim 5 wherein the magnet element comprises a horseshoe magnet configuration with the arms of the horseshoe magnet being oriented in a downward direction when the magnet element is seated in the elongate sliding channel.

16. The magnet switch of claim 5 in which the elongate sliding channel is a linear sliding channel.

17. The magnet switch of claim 5 in which the elongate sliding channel is nonlinear.

18. The magnet switch of claim 17 in which the nonlinear elongate sliding channel is in a zig-zag configuration.

19. The magnet switch of claim 17 in which the elongate sliding channel comprises an elongate path with branched side paths over the respective reed switches.

* * * * *